(12) United States Patent
Fekete et al.

(10) Patent No.: US 11,718,352 B2
(45) Date of Patent: Aug. 8, 2023

(54) VEHICLE ENGINE CRADLE STRUCTURE

(71) Applicants: Nissan North America, Inc., Franklin, TN (US); NISSAN MOTOR CO., LTD., Yokohama (JP)

(72) Inventors: Stephen Fekete, Royal Oak, MI (US); Ryan Corby, Novi, MI (US); Adam Strean, Highland Township, MI (US); Yunosuke Yamada, Tokyo (JP); Seiichiro Eba, Tokyo (JP); Toshio Furuta, Tokyo (JP)

(73) Assignees: Nissan North America, Inc., Franklin, TN (US); NISSAN MOTOR CO., LTD, Yokohama (JP)

( * ) Notice: Subject to any disclaimer, the term of this patent is extended or adjusted under 35 U.S.C. 154(b) by 0 days.

(21) Appl. No.: 17/339,667

(22) Filed: Jun. 4, 2021

(65) Prior Publication Data
US 2022/0388577 A1    Dec. 8, 2022

(51) Int. Cl.
*B62D 25/08* (2006.01)
*B62D 21/15* (2006.01)

(52) U.S. Cl.
CPC ......... *B62D 25/082* (2013.01); *B62D 21/152* (2013.01)

(58) Field of Classification Search
CPC .......................... B62D 25/082; B62D 21/152
USPC .................................................. 296/187.09
See application file for complete search history.

(56) References Cited

U.S. PATENT DOCUMENTS

| | | | |
|---|---|---|---|
| 7,959,171 B2 * | 6/2011 | Takahashi | B60G 11/16 280/124.179 |
| 8,562,021 B1 | 10/2013 | Kuwabara et al. | |
| 8,596,711 B2 | 12/2013 | Yasui et al. | |
| 8,851,520 B2 | 10/2014 | Goellner et al. | |
| 8,894,129 B2 * | 11/2014 | Katou | B62D 21/155 296/187.03 |
| 9,180,913 B2 * | 11/2015 | Ameloot | B62D 21/155 |
| 9,340,229 B2 * | 5/2016 | Gabbianelli | B62D 21/11 |
| 10,479,409 B2 | 11/2019 | Fujiwara et al. | |
| 10,661,834 B2 | 5/2020 | Legray et al. | |
| 10,967,907 B2 * | 4/2021 | Kobayashi | B62D 21/155 |
| 2014/0062129 A1 | 3/2014 | Syed et al. | |
| 2014/0110925 A1 | 4/2014 | Goellner et al. | |
| 2015/0298742 A1 | 10/2015 | Ono et al. | |
| 2016/0023681 A1 * | 1/2016 | Fujikawa | B62D 21/152 296/187.09 |

\* cited by examiner

*Primary Examiner* — Pinel E Romain
(74) *Attorney, Agent, or Firm* — Global IP Counselors, LLP (57) ABSTRACT

A vehicle engine cradle structure includes a front member, a rear assembly and a side member. The front member extends in a vehicle lateral direction and has a first outboard end and a second outboard end. The rear assembly extends in the vehicle lateral direction and has a first outboard area and a second outboard area opposite the first outboard area. The first side member has a first forward end, a first rearward end and a first forward outboard portion all being formed as a single monolithic unitary element. The first forward end is fixedly attached to the first outboard end of the front member. The first rearward end is fixedly attached to the first outboard area of the rear assembly. The first forward outboard portion extends in an outboard direction from the first outboard end of the front member defining an off-center impact area.

20 Claims, 7 Drawing Sheets

VEHICLE ENGINE CRADLE STRUCTURE

BACKGROUND

Technical Field

The present disclosure generally relates to a vehicle engine cradle structure. More specifically, the present disclosure relates to vehicle engine cradle structure that includes an off-center impact receiving area that is defined on elements of the engine cradle structure.

Background Information

Off-center impact receiving structures are being employed in many vehicle body structures. Typically, the off-center impact receiving structure is a separate member or members that are attached to existing frame elements or attached to portions of an engine cradle of a vehicle.

SUMMARY

One object of the present disclosure is to include an off-center impact receiving area (also referred to as an off-center impact area) as an integral part of an engine cradle where an element or elements of the engine cradle are formed and/or manufactured with the off-center impact area, rather than being an add on member or members.

Another object of the present disclosure is to provide an engine cradle with an off-center impart area that is part of side members of the engine cradle where the side members are provided with greater strength than front and rear portions of the engine cradle.

In view of the state of the known technology, one aspect of the present disclosure is to provide a vehicle engine cradle structure with a front member, a rear assembly and a first side member. The front member extends in a vehicle lateral direction perpendicular to a vehicle longitudinal direction and has a first outboard end and a second outboard end opposite the first outboard end. The rear assembly extends in the vehicle lateral direction and has a first outboard area and a second outboard area opposite the first outboard area. The first side member has a first forward end, a first rearward end and a first forward outboard portion all being formed as a single monolithic unitary element. The first forward end is fixedly attached to the first outboard end of the front member. The first rearward end is fixedly attached to the first outboard area of the rear assembly. The first forward outboard portion extends in an outboard direction from the first outboard end of the front member defining an off-center impact area.

Another aspect of the present disclosure is to provide a vehicle engine cradle structure that includes a front member, a rear assembly, a first side member and a second side member. The front member has a first outboard end and a second outboard end opposite the first outboard end. The rear assembly has a first outboard area and a second outboard area opposite the first outboard area. The first side member has a first forward end fixedly attached to first outboard end of the front member and a first rearward end fixedly attached to the first outboard area of the rear assembly. The first side member defines a first frame attachment location dimensioned and positioned to attach to a first frame element of a vehicle. The first frame attachment location is adjacent to the first outboard end of the front member. The first side member has a first forward outboard portion that extends in an outboard direction from the first frame attachment location. The first forward end, the first rearward end the first frame attachment location, the first forward outboard portion are all defined on a single monolithic unitary element that defines the first side member. The second side member has a second forward end fixedly attached to second outboard end of the front member and a second rearward end fixedly attached to second outboard area of the rear assembly. The second side member defines a second frame attachment location dimensioned and positioned to attach to a frame element of a vehicle. The second frame attachment location is adjacent to the first outboard end of the front member. The second side member has a second forward outboard portion that extends in an outboard direction from the second frame attachment location. The second forward end, the second rearward end the second frame attachment location, the second forward outboard portion are all defined on a single monolithic unitary element that defines the second side member. A first distance is defined between the first frame attachment location and the second frame attachment location. A second distance is defined between an outboard end of the first forward outboard portion and the first frame attachment location. The second distance is greater than 10 percent of the first distance and less than 15 percent of the first distance.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
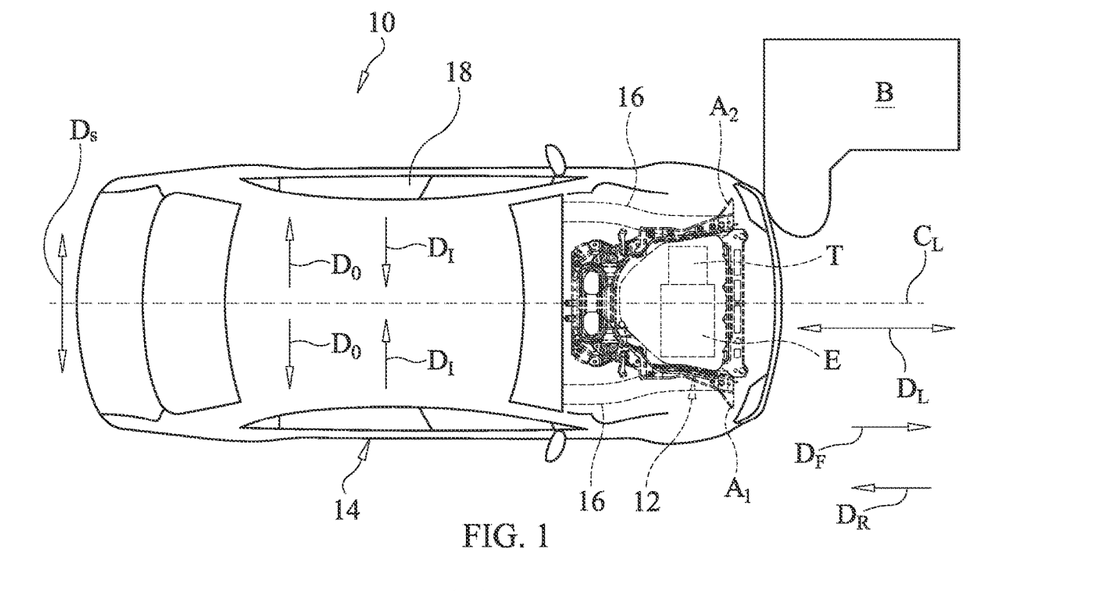
FIG. 1 is a top schematic view of a vehicle with an engine cradle structure that includes an off-center impact receiving area depicted with a test barrier aligned to impact the off-center impact receiving area in accordance with an exemplary embodiment.

Referring initially to FIG. 1, a vehicle 10 that includes a vehicle engine cradle 12 is illustrated in accordance with a first embodiment.

The vehicle 10 includes a vehicle body structure 14 having front side members 16. The front side member 16 are conventional vehicle frame elements that are rigidly attached via, for example, welding techniques to portions of the vehicle body structure 14. The front side members 16 extend forward from a portion of the vehicle body structure 14 that defines a passenger compartment 18. Since vehicle body structures, and front side members are conventional structures well known in the art, further description is omitted for the sake of brevity.

Figure 2:
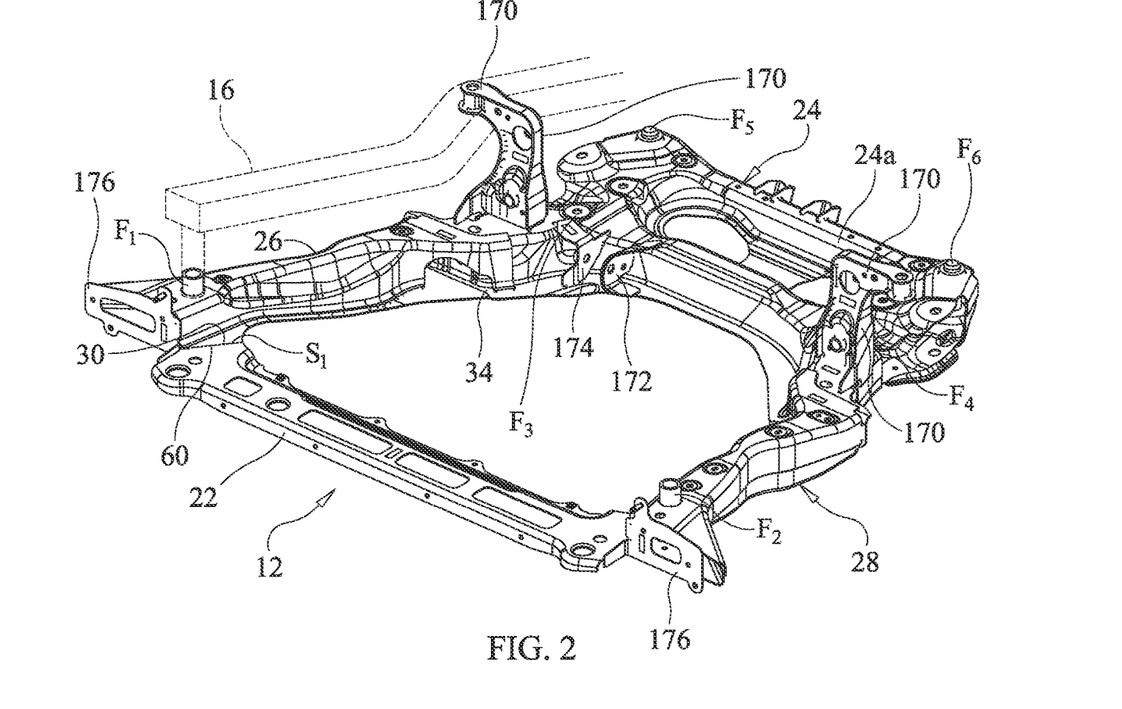
FIG. 2 is perspective view of the engine cradle structure that includes a front member, a rear assembly, a first side assembly and a second side assembly, with the first side assembly having a first off-center impact receiving area and the second side assembly having a second off-center impact receiving area in accordance with the exemplary embodiment.

As shown in FIGS. 1 and 2, the vehicle engine cradle 12 (hereinafter the engine cradle 12) is located beneath the front side member 16 and is attached thereto as described in greater detail below.

Figure 3:
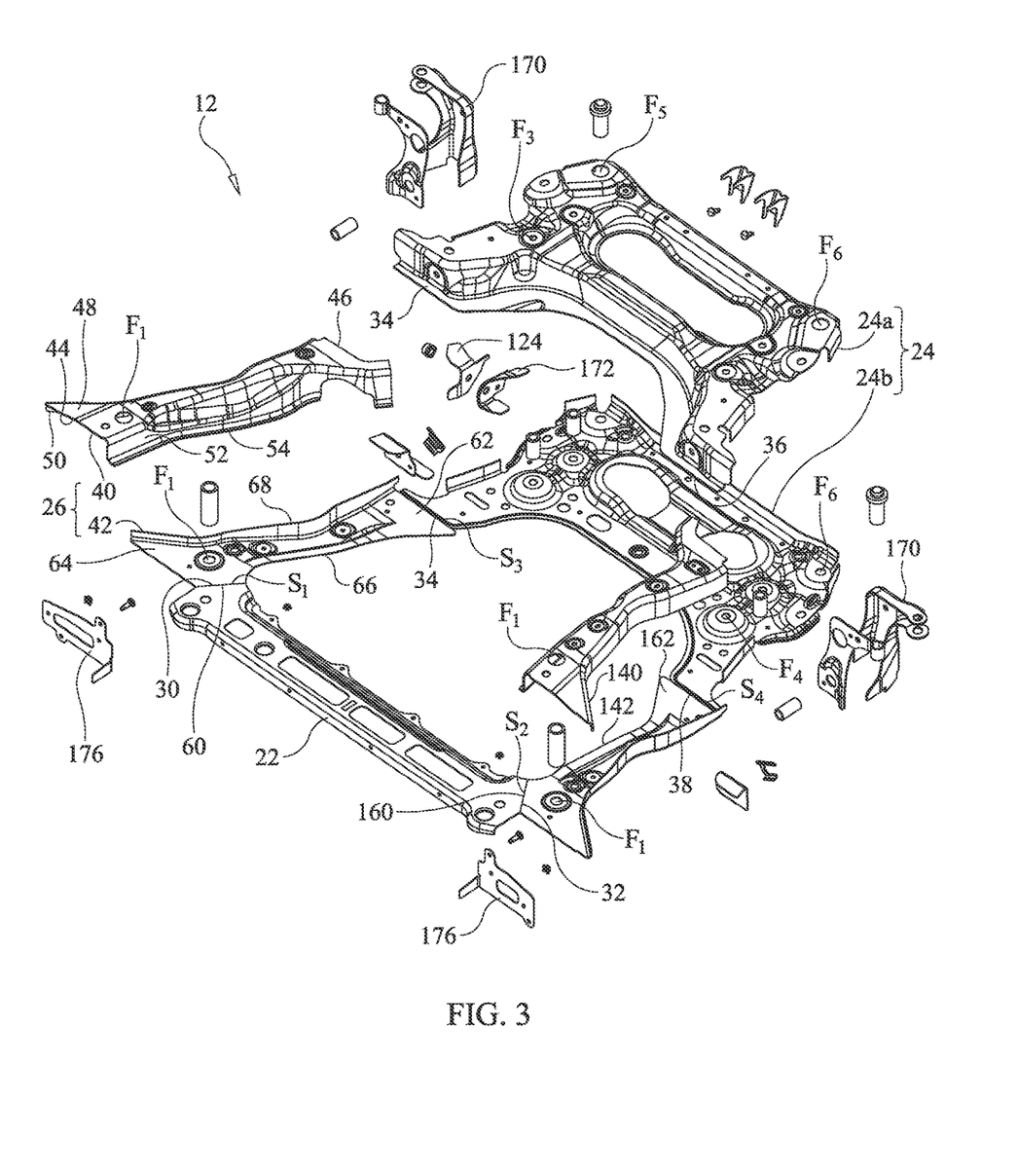
FIG. 3 is perspective exploded view of the engine cradle structure showing the front member, the rear assembly, a first side member and a first lower side member of the first side assembly and, a second side member and a second lower side member of the second side assembly in accordance with the exemplary embodiment.
Figure 4:
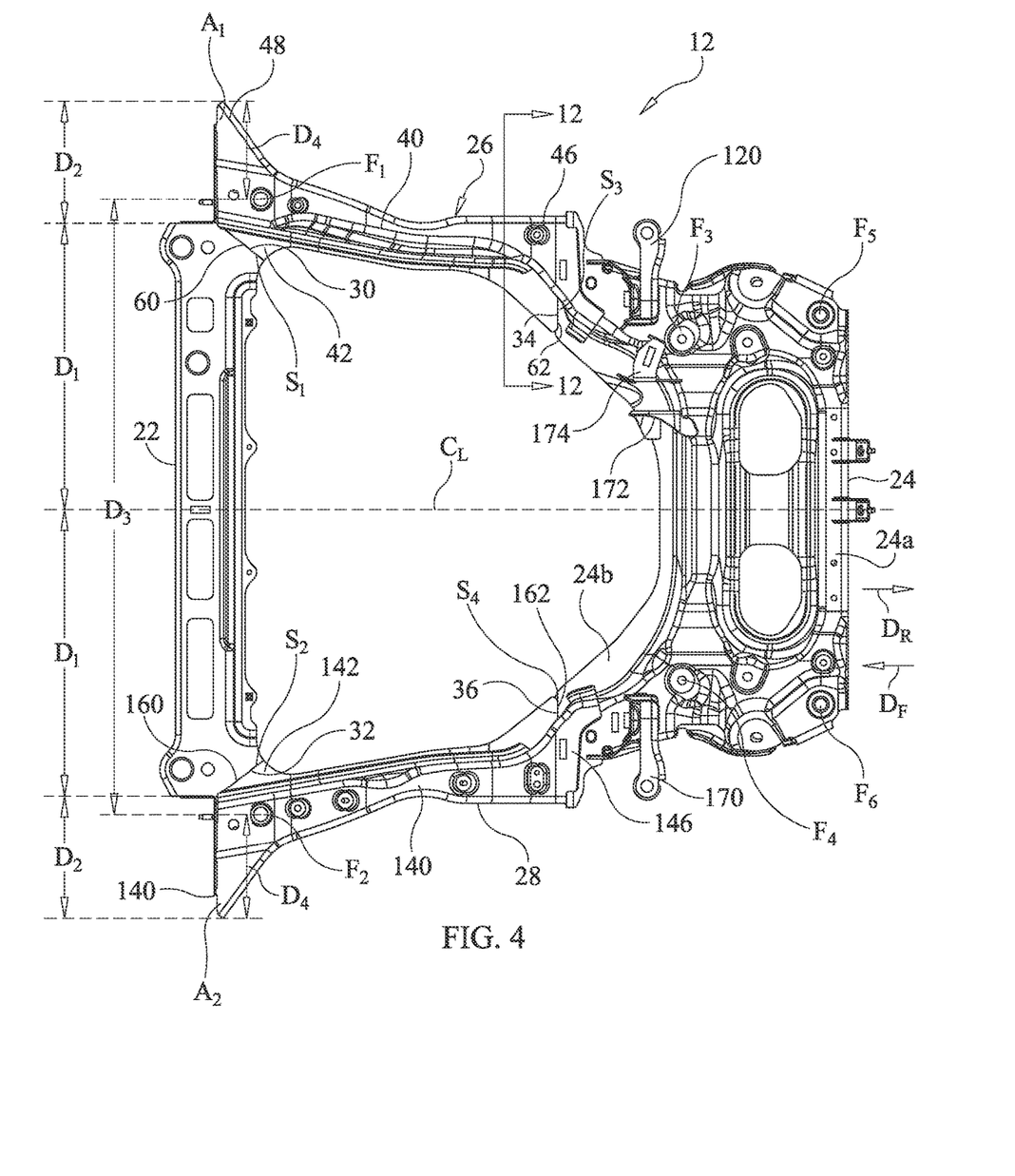
FIG. 4 is top view of the engine cradle structure showing the front member, the rear assembly, the first side member and the first lower side member of the first side assembly and, the second side member and the second lower side member of the second side assembly in accordance with the exemplary embodiment.

As shown in FIGS. 2-4, the engine cradle 12 includes a front member 22, a rear assembly 24, a first side assembly 26 and a second side assembly 28.

The front member 22 extends in a vehicle side-to-side direction $D_S$, also referred to as a vehicle lateral direction $D_S$. The vehicle lateral direction $D_S$ is perpendicular to a vehicle longitudinal direction DL of the vehicle 10. The front member 22 has a first outboard end 30 and a second outboard end 32 opposite the first outboard end 30.

The rear assembly 24 also extends in the vehicle lateral direction $D_S$ perpendicular to the vehicle longitudinal direction DL. The rear assembly 24 has an upper portion 24a and a lower portion 24b that are welded to one another using any one of a variety of conventional welding techniques. The rear assembly 24 has a first outboard area 34 and a second outboard area 36 opposite the first outboard area 34. The first outboard area 34 and the second outboard area 36 are located along a forward edge of the rear assembly 24 at opposite ends thereof.

The front member 22 and the rear assembly 24 define a vehicle longitudinal centerline CL that coincides with a center line of the vehicle 10. A shown in FIG. 4, the first outboard end 30 of the front member 22 defines a first lateral distance $D_1$ from the vehicle longitudinal centerline CL.

As shown in several of the drawings, the vehicle 10 and the engine cradle 12 define a vehicle inboard direction $D_I$ and a vehicle outboard direction $D_O$, both defined relative to the vehicle longitudinal centerline CL. The vehicle 10 further defines a vehicle forward direction DF and a vehicle rearward direction DR.

As shown in FIG. 3, the first side assembly 26 includes a first side member 40 (an upper member) and a first lower side member 42. The first side member 40 is shown removed from the engine cradle 12 in FIGS. 5, 6 and 7.

The first side member 40 of the first side assembly 26 has a first forward end 44, a first rearward end 46 and a first forward outboard portion 48 all being formed as a single monolithic unitary element. The first forward end 44 is fixedly attached to the first outboard end 30 of the front member 22 in a manner described further below. The first rearward end 46 is directly fixedly attached to the first outboard area 34 of the rear assembly 24. The first forward outboard portion 48 extends in the outboard direction $D_O$ from the first outboard end 30 of the front member 22 and partially defines an off-center impact area $A_1$.

As shown in FIGS. 2 and 4, the first side member 26 defines a first frame attachment location $F_1$ dimensioned and positioned to attach to the corresponding one of the front side members 16 (also referred to as the first frame element 16 of the vehicle 10) proximate a front end of the front side member 16. The first frame attachment location $F_1$ is adjacent to the first outboard end 30 of the front member 22.

As shown in FIG. 4, the first forward outboard portion 48 of the first side member 26 extends in the outboard direction $D_O$ from the first frame attachment location $F_1$. The first forward outboard portion 48 has an outboard-most section 48a (a front outboard corner thereof) that is a second lateral distance $D_2$ from the first outboard end 30 of the front member 22, as measured in the vehicle lateral direction $D_S$. The second lateral distance $D_2$ can be equal to at least 35 percent of the first lateral distance $D_1$. The second lateral distance $D_2$ can be equal to less than 45 percent of the first lateral distance $D_1$. In other words, the second lateral distance $D_2$ is between 35 and 35 percent of the value of the first lateral distance $D_1$.

Figure 5:
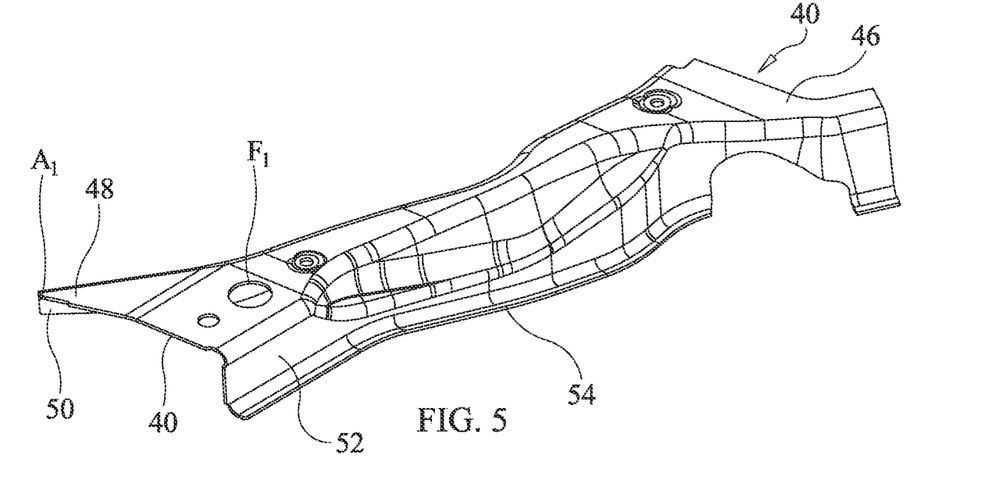
FIG. 5 is a perspective view of the first side member of the first side assembly shown removed from the engine cradle structure in accordance with the exemplary embodiment.
Figure 6:
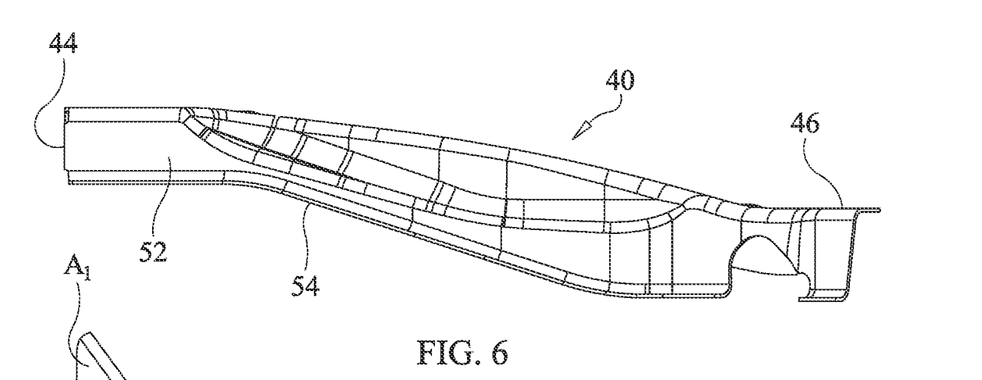
FIG. 6 is an inboard side view of the first side member of the first side assembly shown removed from the engine cradle structure in accordance with the exemplary embodiment.
Figure 7:
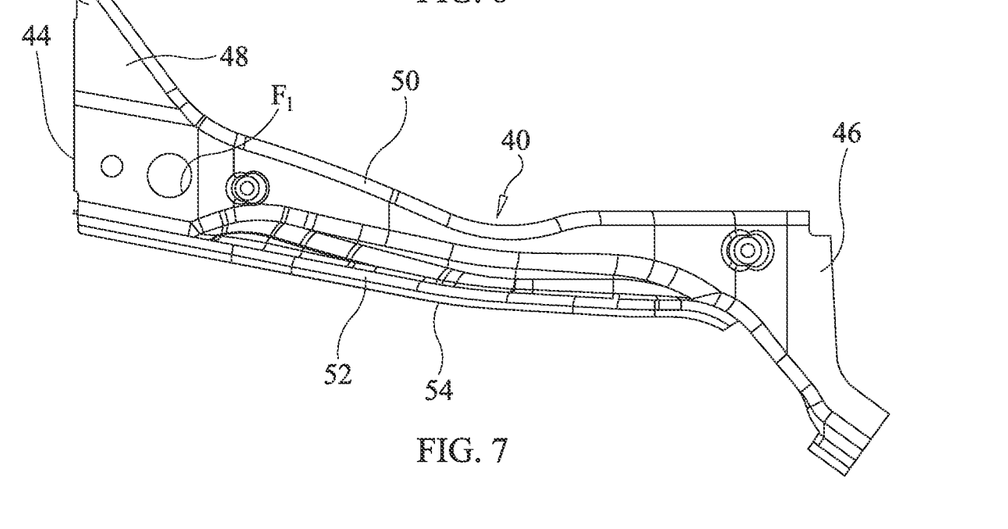
FIG. 7 is a top view of the first side member of the first side assembly shown removed from the engine cradle structure in accordance with the exemplary embodiment.
Figure 8:
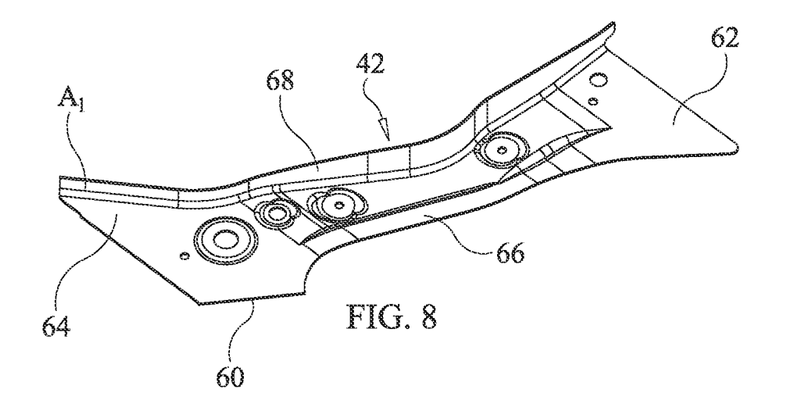
FIG. 8 is a perspective view of the first lower side member of the first side assembly shown removed from the engine cradle structure in accordance with the exemplary embodiment.

As shown in FIGS. 5-7, the first side member 26 is further formed with a downwardly extending outboard side 50 and a downwardly extending inboard side 52 with an inboard extending flange 54. The downwardly extending outboard side 50, the downwardly extending inboard side 52, the inboard extending flange 54, the first forward end 44, the first rearward end 46 and the first forward outboard portion 48 all being formed as a single monolithic unitary element.

As shown in FIGS. 3 and 8-10, the first lower side member 42 of the first side assembly 26 has a first lower forward end 60, a first lower rearward end 62, a first lower forward outboard portion 64, an inboard extending flange 66 and an outboard upwardly extending flange 68 that are all formed as a single monolithic unitary element.

Figure 12:
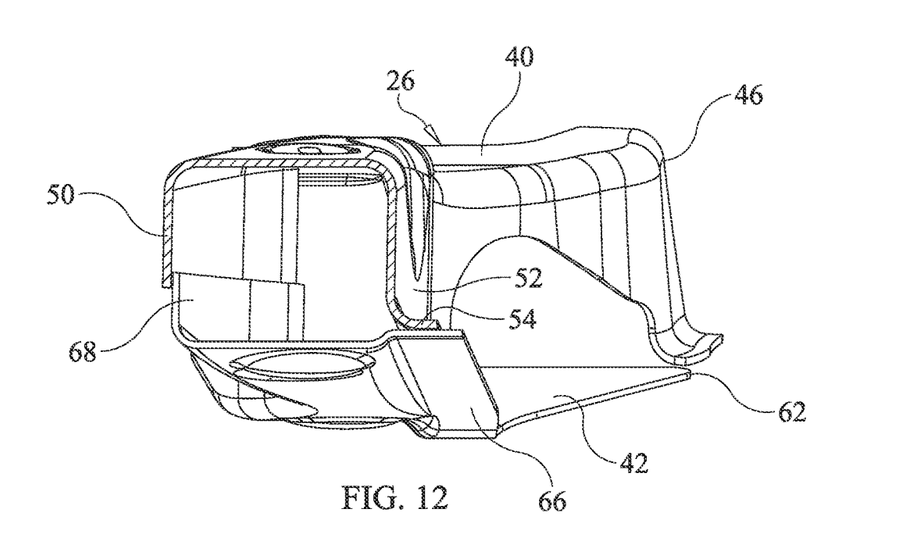
FIG. 12 is a cross-sectional view of the first side assembly taken along the line 12-12 in FIG. 4 in accordance with the exemplary embodiment.
Figure 13:
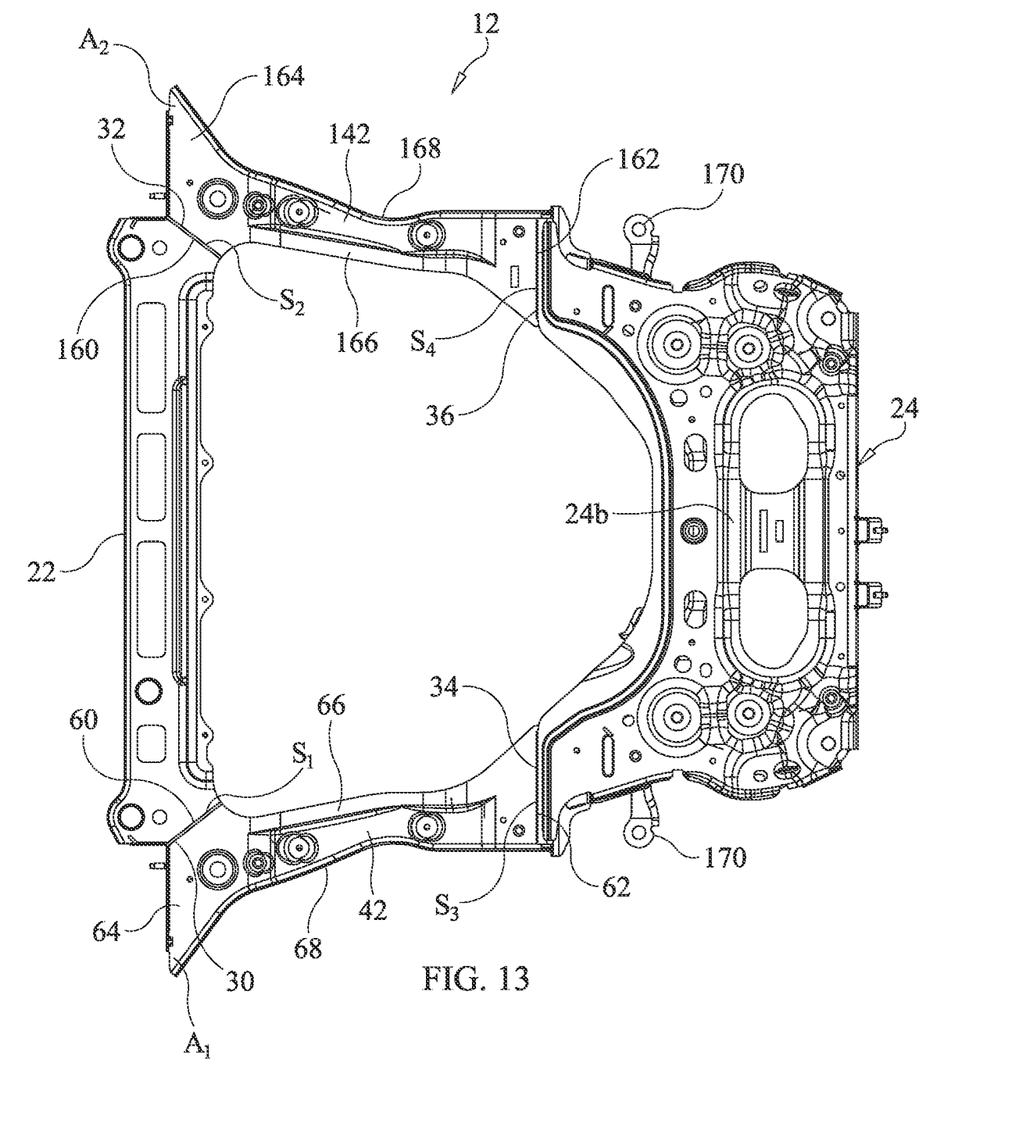
FIG. 13 is a bottom view of the engine cradle structure in accordance with the exemplary embodiment.

The first lower forward end 60 is directly fixedly attached to the first outboard end 30 of the front member 22 via any of a variety of welding techniques. The attachment between the first lower forward end 60 and the first outboard end 30 of the front member 22 defines a first seam $S_1$ that is angularly offset from the vehicle forward direction DF defining an acute angle therebetween. The first lower rearward end 62 is directly fixedly attached to the first outboard area 34 of the rear assembly 24. The inboard extending flange 66 is directly fixedly attached to the inboard extending flange 54 of the downwardly extending inboard side 52 of the first side member 40 as shown in FIG. 12, via any of a variety of welding techniques. The outboard upwardly extending flange 68 is directly fixedly attached to the downwardly extending outboard side 50 of the first side member 40, as shown in FIG. 12 via any of a variety of welding techniques.

The first lower forward outboard portion 64 of the first lower side member 42 further defines the off-center impact area $A_1$ with the first forward outboard portion 48 of the first side member 40.

With reference to FIGS. 3 and 4, a description is now provided for the second side assembly 28. The second side assembly 28 is basically identical to the first side assembly 26, except that the second side assembly 28 is a symmetrical mirror image of the first side assembly 26. There are several attachment points on the second side assembly 28 that differ from those on the first side assembly 26. However, the structural features of the second side assembly 28 are basically the same as the first side assembly 28.

The second side assembly 28 includes a second side member 140 (an upper member) and a second lower side member 142. The second side member 140 has a second forward end 144, a second rearward end 146, a second forward outboard portion 148, a downwardly extending outboard side 150, a downwardly extending inboard side 152 and an inboard extending flange 154 all being formed as a single monolithic unitary element.

The second forward end 144 is fixedly attached to the second outboard end 32 of the front member 22. The second rearward end 146 is fixedly attached to the second outboard area 34 of the rear assembly 24. The second forward outboard portion 148 extends in the outboard direction $D_O$ from the second outboard end 32 of the front member 22 at least partially defining another off-center impact area $A_2$.

The second side member 140 defines a second frame attachment location $F_2$ dimensioned and positioned to attach to the corresponding one of the front side members 16 (frame element of a vehicle 10). The second frame attachment location $F_2$ is located adjacent to the second outboard end 32 of the front member 22.

The second forward outboard portion 148 of the second side member 28 extends in the outboard direction $D_O$ from the second frame attachment location $F_2$.

A third distance $D_3$ is defined between the second frame attachment location $F_2$ of the second side member 140 and the first frame attachment location $F_1$ of the first side member 40. A fourth distance $D_4$ is defined between the outboard end of the first forward outboard portion 48 and the first frame attachment location $F_1$. Further, the fourth distance $D_4$ is also defined between the outboard end of the second forward outboard portion 148 and the second frame attachment location $F_2$, measured in the vehicle lateral direction $D_S$.

As shown in FIG. 4, the fourth distance $D_4$ is greater than 10 percent of the third distance $D_3$ and less than 15 percent of the third distance $D_3$. Further, the second outboard end 32 of the front member 22 and the vehicle longitudinal centerline CL are spaced apart from one another by the first lateral distance $D_1$. As well, the second outboard end 32 of the front member 22 and the outboard end of the second forward outboard portion 148 are spaced apart from one another by the second lateral distance Dz.

The second lower side member 142 has a second lower forward end 160, a second lower rearward end 162, a second lower forward outboard portion 164, an inboard extending flange 166 and an outboard upwardly extending flange 168 all being formed as a single monolithic unitary element.

The second lower forward end 160 is directly fixedly attached to the second outboard end 32 of the front member 22 via any of a variety of welding techniques thereby defining a second seam $S_2$. The second seam $S_2$ is angularly offset from the vehicle longitudinal centerline CL defining an acute angle therebetween. The second lower rearward end 162 is directly fixedly attached to the second outboard area 36 of the rear assembly 24 via any of a variety of welding techniques. The inboard extending flange 166 of the second lower side member 142 is directly fixedly attached to an inboard extending flange 154 of the downwardly extending inboard side 150 of the second side member 140 via any of a variety of welding techniques. The outboard upwardly extending flange 168 of the second lower side member 142 is directly fixedly attached to the downwardly extending outboard side 164 of the second side member 140.

The second lower forward outboard portion 164 of the second lower side member 132 and the second forward outboard portion 148 of the second side member 140 together further define the off-center impact area $A_2$.

The engine cradle 12 is attached to the vehicle body structure 14 at frame attachment locations $F_1$, $F_2$, $F_3$, $F_4$, $F_5$ and $F_6$. Attachment structures (not shown) fix the engine cradle 12 to corresponding attachment locations defined along portions of the front side members 16 that extend downward from the front side members 16 and/or structures forward of the passenger compartment 18 in a conventional manner.

As shown in FIGS. 2 and 3, the engine cradle 12 also includes engine attachment brackets 172 and 174. These brackets 172 and 174 are one example of various engine attachment brackets that can secure an engine and transmission (shown in FIG. 1 in phantom) to the engine cradle 12. It should be understood from the drawings and the description herein that the engine cradle 12 is not limited to inclusion of the brackets 172 and 174 and that other bracket configurations are possible depending upon the engine and transmission installed to the engine cradle 12.

As shown in FIGS. 2 and 3, front facing surfaces of each of the first side member 40 and the second side member 140 include bumper assembly attachment brackets 176.

In the depicted embodiment, the engine cradle 12 is assembled with materials that have differing response to stress. For example, the front member 22 is made of a metallic material that has a predetermined tensile strength (yield strength) of approximately 370 MPa (megapascals). The rear assembly 24 is made of a metallic material that has a predetermined tensile strength (yield strength) of approximately 590 MPa. The first side assembly 26 and the second side assembly 28 are made of a metallic material that has a predetermined tensile strength (yield strength) of approximately 780 MPa. More specifically, the first side assembly 26 (including the first side member 40 and the first lower side member 42) and the second side assembly 28 (including the second side member 140 and the second lower side member 142) are each made of a metallic material with material components that differ from the front member 22 and the rear assembly 24. For example, the metal (a steel or steel alloy) used to manufacture the first side assembly 26 and the second side assembly 28 includes an amount of titanium that is less that 0.20% by weight and an amount of chromium that is below 0.10% by weight. Preferably, the metal material used to make the first side assembly 26 and the second side assembly 28 includes no more than 0.14% by weight of titanium and chromium.

Figure 9:
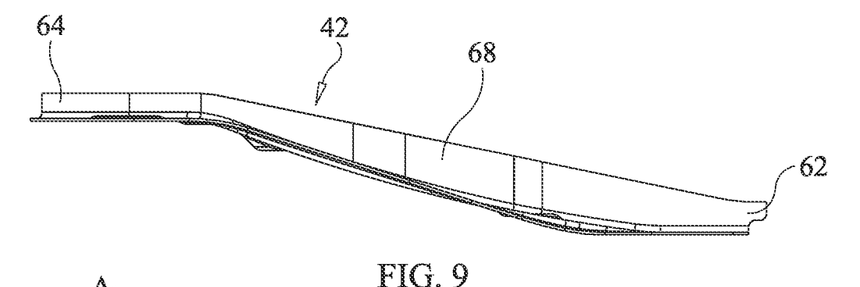
FIG. 9 is an inboard side view of the first lower side member of the first side assembly shown removed from the engine cradle structure in accordance with the exemplary embodiment.
Figure 10:
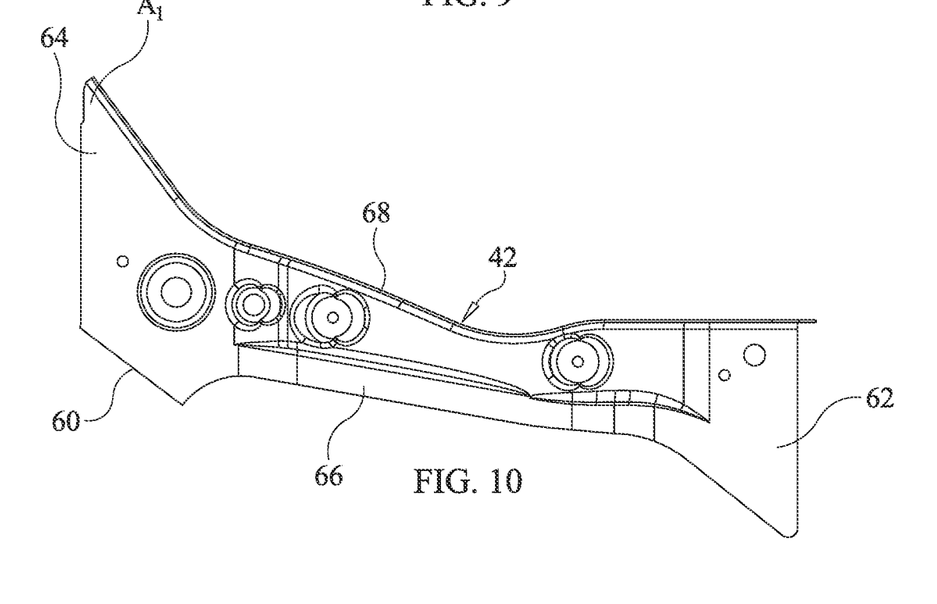
FIG. 10 is a top view of the first lower side member of the first side assembly shown removed from the engine cradle structure in accordance with the exemplary embodiment.
Figure 11:
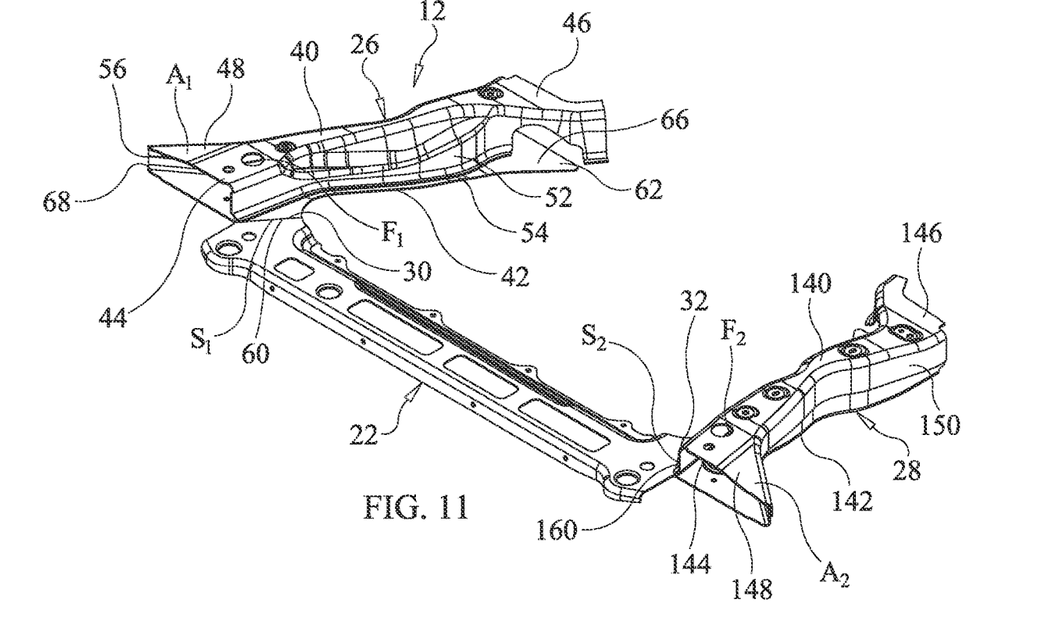
FIG. 11 is a perspective view of the engine cradle structure partially assembled showing the front member, the first side assembly and the second side assembly attached to one another in accordance with the exemplary embodiment.

As shown in FIGS. 6 and 9 show the first side member 40 and the first lower side member 42 in an orientation that corresponds to their respective orientation when parts of the engine cradle 12. Specifically, the first forward end 44 of the first side member 40 is located higher above the ground than the first rear end 46. Similarly, the first lower forward end 60 of the first side member 40 is located higher above the ground than the first lower rearward end 62. Correspondingly, the rear assembly 24 is located closer to the ground than the front member 22 with the engine cradle 12 installed to the vehicle 10 and the vehicle 10 being on level ground.

The engine cradle 12 described above is designed such that in response to an impact event between the barrier B shown in FIG. 1 and either one of the off-center impact areas $A_1$ and $A_2$ (in the area where the front bumper attachment brackets 176 are installed) impact energy is transmitted to other areas of the engine cradle 12. In particular, if the impact occurs along the off-center impact area $A_1$, impact energy is transmitted along the first side assembly 26 to the rear assembly 24 of the engine cradle 12. Since the engine cradle 12 is attached to the vehicle body structure 14, some of the impact energy is transmitted to the vehicle body structure 14. Another portion of the impact energy can possibly cause deformation of the first side assembly 26 in a central area thereof causing the first side assembly 26 to contact the engine and/or transmission, thereby further transmitting impact energy to the engine and transmission. If the impact occurs along the off-center impact area $A_2$, impact energy is transmitted along the second side assembly 28 to the rear assembly 24 of the engine cradle 12, and possibly deforming the second side assembly 28 causing the second side assembly 28 to contact the engine and transmission transmitting impact energy thereto.

Other than the features of the engine cradle 12 described above, there are numerous conventional components of the vehicle 10 and the vehicle body structure 14 that are well known in the art. Since such conventional components are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle engine cradle. Accordingly, these terms, as utilized to describe the present invention should be interpreted relative to a vehicle equipped with the vehicle engine cradle.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle engine cradle structure, comprising:
    a front member extending in a vehicle lateral direction perpendicular to a vehicle longitudinal direction and having a first outboard end and a second outboard end opposite the first outboard end;
    a rear assembly extending in the vehicle lateral direction and having a first outboard area and a second outboard area opposite the first outboard area; and
    a first side member having a first forward end, a first rearward end and a first forward outboard portion all being formed as a single monolithic unitary element, the first forward end being fixedly attached to the first outboard end of the front member, the first rearward end being fixedly attached to the first outboard area of the rear assembly and the first forward outboard portion extending in an outboard direction from the first outboard end of the front member defining an off-center impact area.

2. The vehicle engine cradle structure according to claim 1, wherein
    the front member and the rear assembly define a vehicle longitudinal centerline, the first outboard end of the front member being defined at a first lateral distance from the vehicle longitudinal centerline, and
    the first forward outboard portion having an outboardmost section that is a second lateral distance from the first outboard end of the front member, the second lateral distance being at least 35 percent of the first lateral distance.

3. The vehicle engine cradle structure according to claim 2, wherein
    the second lateral distance is less than 45 percent of the first lateral distance.

4. The vehicle engine cradle structure according to claim 1, wherein
    the first side member defines a first frame attachment location dimensioned and positioned to attach to a first frame element of a vehicle, the first frame attachment location being adjacent to the first outboard end of the front member.

5. The vehicle engine cradle structure according to claim 4, further comprising:
    a second side member having a second forward end, a second rearward end and a second forward outboard portion all being formed as a single monolithic unitary element, the second forward end being fixedly attached to the second outboard end of the front member, the second rearward end being fixedly attached to the second outboard area of the rear assembly and the second forward outboard portion extending in an outboard direction from the second outboard end of the front member further defining another off-center impact area.

6. The vehicle engine cradle structure according to claim 5, wherein
the second outboard end of the front member is defined at a third lateral distance from the vehicle longitudinal centerline, the third lateral distance and the first lateral distance being equal to one another, and
the second forward outboard portion having an outboardmost section a fourth lateral distance from the second outboard end of the front member, the fourth lateral distance being equal to the second lateral distance.

7. The vehicle engine cradle structure according to claim 6, wherein
the second side member defines a second frame attachment location dimensioned and positioned to attach to a second frame element of a vehicle, the second frame attachment location being adjacent to adjacent to the second outboard end of the front member.

8. The vehicle engine cradle structure according to claim 1, wherein
the first side member is further formed with a downwardly extending outboard side and a downwardly extending inboard side with an inboard extending flange, the downwardly extending outboard side, the downwardly extending inboard side, the first forward end, the first rearward end and the first forward outboard portion all being formed as a single monolithic unitary element.

9. The vehicle engine cradle structure according to claim 8, further comprising:
a first lower side member having a first lower forward end, a first lower rearward end, a first lower forward outboard portion, an inboard extending flange and an outboard upwardly extending flange all being formed as a single monolithic unitary element,
the first lower forward end being fixedly attached to the first outboard end of the front member, the first lower rearward end being fixedly attached to the first outboard area of the rear assembly, the inboard extending flange being fixedly attached to an inboard extending flange of the downwardly extending inboard side of the first side member and the outboard upwardly extending flange being fixedly attached to the downwardly extending outboard side of the first side member.

10. The vehicle engine cradle structure according to claim 9, wherein
the first side member and first lower side member define a first side structure of the engine cradle, and
the first lower forward outboard portion of the first lower side member and the first forward outboard portion of the first side member together define the off-center impact area with the first forward outboard portion of the first side member.

11. The vehicle engine cradle structure according to claim 9, wherein
the first lower side member and the first side member are made of a high strength steel that includes no more than 0.14% by weight of titanium and chromium.

12. A vehicle engine cradle structure, comprising:
a front member having a first outboard end and a second outboard end opposite the first outboard end;
a rear assembly having a first outboard area and a second outboard area opposite the first outboard area;
a first side member having a first forward end fixedly attached to first outboard end of the front member and a first rearward end fixedly attached to the first outboard area of the rear assembly, the first side member defining a first frame attachment location dimensioned and positioned to attach to a first frame element of a vehicle, the first frame attachment location being adjacent to the first outboard end of the front member, the first side member having a first forward outboard portion that extends in an outboard direction from the first frame attachment location, with the first forward end, the first rearward end the first frame attachment location, the first forward outboard portion all being defined on a single monolithic unitary element that defines the first side member; and
a second side member having a second forward end fixedly attached to second outboard end of the front member and a second rearward end fixedly attached to second outboard area of the rear assembly, the second side member defining a second frame attachment location dimensioned and positioned to attach to a frame element of a vehicle, the second frame attachment location being adjacent to the first outboard end of the front member, the second side member having a second forward outboard portion that extends in an outboard direction from the second frame attachment location, with the second forward end, the second rearward end the second frame attachment location, the second forward outboard portion all being defined on a single monolithic unitary element that defines the second side member, and
with a first distance being defined between the first frame attachment location and the second frame attachment location, and a second distance being defined between an outboard end of the first forward outboard portion and the first frame attachment location, the second distance being greater than 10 percent of the first distance and less than 15 percent of the first distance.

13. The vehicle engine cradle structure according to claim 12, wherein
a third distance being defined between the outboard end of the second forward outboard portion and the second frame attachment location, the third distance being equal to the second distance.

14. The vehicle engine cradle structure according to claim 12, wherein
a first lower side member having a first lower forward end, a first lower rearward end, a first lower forward outboard portion, an inboard extending flange and an outboard upwardly extending flange all being formed as a single monolithic unitary element,
the first lower forward end being fixedly attached to the first outboard end of the front member, the first lower rearward end being fixedly attached to the first outboard area of the rear assembly, the inboard extending flange being fixedly attached to an inboard extending flange of the downwardly extending inboard side of the first side member and the outboard upwardly extending flange being fixedly attached to the downwardly extending outboard side of the first side member.

15. The vehicle engine cradle structure according to claim 14, wherein
the first side member and first lower side member define a first side structure of the engine cradle.

16. The vehicle engine cradle structure according to claim 14, wherein the first lower forward outboard portion of the first lower side member further defines an off-center impact area with the first forward outboard portion of the first side member.

17. The vehicle engine cradle structure according to claim 14, wherein
a second lower side member having a second lower forward end, a second lower rearward end, a second lower forward outboard portion, an inboard extending flange and an outboard upwardly extending flange all being formed as a single monolithic unitary element,
the second lower forward end being fixedly attached to the second outboard end of the front member, the second lower rearward end being fixedly attached to the second outboard area of the rear assembly, the inboard extending flange of the second lower side member being fixedly attached to an inboard extending flange of the downwardly extending inboard side of the second side member and the outboard upwardly extending flange of the second lower side member being fixedly attached to the downwardly extending outboard side of the second side member.

18. The vehicle engine cradle structure according to claim 17, wherein
the second side member and second lower side member define a second side structure of the engine cradle.

19. The vehicle engine cradle structure according to claim 17, wherein
the second lower forward outboard portion of the second lower side member further defines an off-center impact area with the second forward outboard portion of the second side member.

20. The vehicle engine cradle structure according to claim 14, wherein
the first lower side member and the first side member are made of a high strength steel that includes no more than 0.14% by weight of titanium and chromium.

* * * * *